US009414608B1

United States Patent
Goodyear, Jr.

(10) Patent No.: US 9,414,608 B1
(45) Date of Patent: Aug. 16, 2016

(54) FINGER PAD FOR POULTRY FEATHER PLUCKING MACHINE

(71) Applicant: E. William Goodyear, Jr., Charlotte, NC (US)

(72) Inventor: E. William Goodyear, Jr., Charlotte, NC (US)

(73) Assignee: WILLIAM GOODYEAR COMPANY, Monroe, NC (US)

( * ) Notice: Subject to any disclaimer, the term of this patent is extended or adjusted under 35 U.S.C. 154(b) by 0 days.

(21) Appl. No.: 15/142,742

(22) Filed: Apr. 29, 2016

Related U.S. Application Data

(63) Continuation-in-part of application No. 14/820,940, filed on Aug. 7, 2015, now Pat. No. 9,332,768.

(60) Provisional application No. 62/034,572, filed on Aug. 7, 2014.

(51) Int. Cl.
*A22B 5/08* (2006.01)
*A22C 21/02* (2006.01)

(52) U.S. Cl.
CPC .................................. *A22C 21/022* (2013.01)

(58) Field of Classification Search
CPC ........ A22C 21/02; A22C 21/022; A22B 5/00; A22B 5/08
USPC ........... 452/71, 75, 81, 82–84, 86, 87, 88, 89, 452/93, 94
See application file for complete search history.

(56) References Cited

U.S. PATENT DOCUMENTS

| | | | | | |
|---|---|---|---|---|---|
| 2,561,681 | A | * | 7/1951 | Wise | A47B 67/02 132/315 |
| 2,571,042 | A | * | 10/1951 | Kemp | A22C 21/022 15/236.1 |
| 2,714,222 | A | * | 8/1955 | McKendree | 452/93 |
| 4,174,551 | A | * | 11/1979 | McKendree | A22C 21/02 452/93 |
| 4,873,747 | A | * | 10/1989 | Dewberry | A22C 21/022 452/93 |
| 6,918,825 | B2 | * | 7/2005 | Conaway | A22C 21/02 452/88 |
| 2004/0147211 | A1 | * | 7/2004 | Mostoller | A22C 21/022 452/82 |
| 2005/0048888 | A1 | * | 3/2005 | Conaway | A22C 21/02 452/75 |
| 2005/0221744 | A1 | * | 10/2005 | Rapp | A22C 21/022 452/88 |
| 2010/0093266 | A1 | * | 4/2010 | Chattin | A22C 21/0061 452/95 |
| 2016/0037789 | A1 | * | 2/2016 | Goodyear, Jr. | A22C 21/022 452/71 |

* cited by examiner

*Primary Examiner* — Richard Price, Jr.
(74) *Attorney, Agent, or Firm* — Ralph H. Dougherty

(57) ABSTRACT

A unitary resilient rubber finger pad for a poultry plucking machine, the finger pad having a circular base with a central aperture therethrough, an annular base plate completely embedded within the circular base; a plurality of fingers extending from one face of the base, each of the fingers being fixed to the face of said base, each of said fingers having a base, a tapered shank, and a grip pattern on a portion of said shank remote from said base; the fingers being arranged in a pair of concentric rings on the base. The method of mounting the finger pad is also disclosed.

8 Claims, 5 Drawing Sheets

FINGER PAD FOR POULTRY FEATHER PLUCKING MACHINE

CROSS REFERENCE TO RELATED APPLICATION

This application claims the benefit of U.S. patent application Ser. No. 14/820,940, filed Aug. 7, 2015, and U.S. Provisional Application No. 62/034,572, filed Aug. 7, 2014.

FIELD OF THE INVENTION

This invention relates generally to equipment used in connection with poultry feather picking machines, and particularly to an improved poultry feather-plucking finger pad having integral resilient picking fingers.

BACKGROUND OF THE INVENTION

Machines for plucking the feathers from poultry are used in poultry processing plants. These plucking (or picking) machines typically have drums and/or discs to which resilient rubber or similar material picking fingers are mounted. The drums or discs are positioned along each side of a path of travel along which birds are conveyed. The drums or discs are rotated at speeds as high as 600 to 1250 rpm causing the resilient fingers to be continuously driven into contact with the birds. Frictional forces between the rubber fingers and the feathers remove the feathers from the bird. However, the fingers tend to wear quickly, with an average processing line requiring replacement of from 8,000 to 10,000 fingers per month. With many processing plants running several processing lines, it is common for a plant to replace one half million fingers per year.

Picker fingers typically have an enlarged disc-shaped base formed with an annular recess from which a tapered, furrowed shank extends. Each finger is individually installed in a disc with the annular recess of the finger base located within a hole in the support disc or drum, with the recess edges abutting and gripping opposite sides of the rim about the hole of the support disc. Worn fingers are often removed from the disc by cutting the finger at its annular recess. The two pieces can then be removed. A new finger is installed by insertion through the enlarged hole in the disc until its tapered surface adjacent its enlarged base engages the rim about the hole. The shank is then pulled with a substantial degree of force in order to seat the annular recess about the edge of the hole. It is difficult to seat the picking fingers within the disc holes manually due to the amount of force required in pulling their base portions into the support holes. Further, the region of the disc and the attached fingers becomes dirty and "gummy" from the fat from the birds and dust from the feathers, A substantial amount of strength is required to seat replacement fingers, and the space available in which to work is usually quite restricted making it awkward to exert the force needed to properly seat the annular recess about the hole edge. Also, substantial training of the personnel doing the finger replacement is required. A prior art mechanism utilized individual fingers mounted to extend through mating holes in a support plate, and having a backing plate abutting the rear of the support plate to hold each finger securely. To ensure that the backing plate and the support plate rotated as a unitary piece, an integrated centrifugal locking mechanism was utilized. This locking mechanism was required to hold the support plate and the backing plate together tightly when the disc assembly was rotating at its maximum velocity.

In addition, it should be noted that the finger locking mechanism becomes inoperable after a few hours due to gumming from the poultry fat and from debris and fat clogging the locking mechanism, and often fingers break off, requiring replacement for either reason.

A plucking machine typically has 64 discs of ten fingers each, and there are usually four machines in a plucking line. Wholesale changes of fingers are often required. To change the fingers on a single machine at the present time requires from 4 to 7 man hours per machine. It should also be noted that during finger changes, frequently some of the rubber fingers are accidentally dropped into a drain or an offal tray.

SUMMARY OF THE INVENTION

The present invention is a novel unitary disc and rubber finger pad that allows an operator to easily install, remove, and replace the plucking finger pad without the necessity of applying excessive force. Installation, removal, and replacement of the finger pad is accomplished quickly, easily and comfortably, and does not require training of the operators. With the present invention, a single person can change all of the fingers in one machine in 30 minutes, a greater than 80% reduction in finger replacement time. In addition, since the finger pads being handled are larger than individual fingers, there is very little droppage, resulting in 70% less rubber in the drains or offal trays.

The novel rubber plucking finger pad of the present invention does not have the annular recess and oversized shank that was present in the fingers of the prior art, nor must the fingers be installed or replaced individually.

A finger pad assembly consists of a unitary rubber finger plate, with fingers protruding from one side, and a retaining means comprising a mounting bolt, washer, and lock washer, as required or desired to fasten and retain the assembly onto the end of a drive shaft of the plucking machine. The finger pad has a flat face which is placed against the end of a drive shaft of the plucking machine, and is held onto the end of the drive shaft by the mounting bolt. Alternatively, the finger pad may be provided with a central mounting hole in its base which is adapted to fit over the drive shaft of the plucking machine and is held in position by a mounting bolt and washers, as required.

OBJECTS OF THE INVENTION

It is the principal object of the invention to provide an improved resilient rubber finger pad for the plucking of feathers from poultry.

It is another object of the invention to provide an improved resilient rubber finger that can be easily and quickly mounted, removed, and replaced onto a drive shaft of a poultry feather plucking machine.

It is also an object of the invention to provide an improved resilient rubber finger pad in which the fingers are unitary with the finger pad.

It is also an object of the invention to provide an improved resilient rubber finger pad which requires fewer pieces than are currently required.

It is also an object of the invention to provide an improved resilient rubber finger pad and finger pad assembly which is configured to avoid damage during the installation procedure.

BRIEF DESCRIPTION OF THE DRAWINGS

The foregoing and other objects will become more readily apparent by referring to the following detailed description and the appended drawings in which.

DETAILED DESCRIPTION

Figure 1:
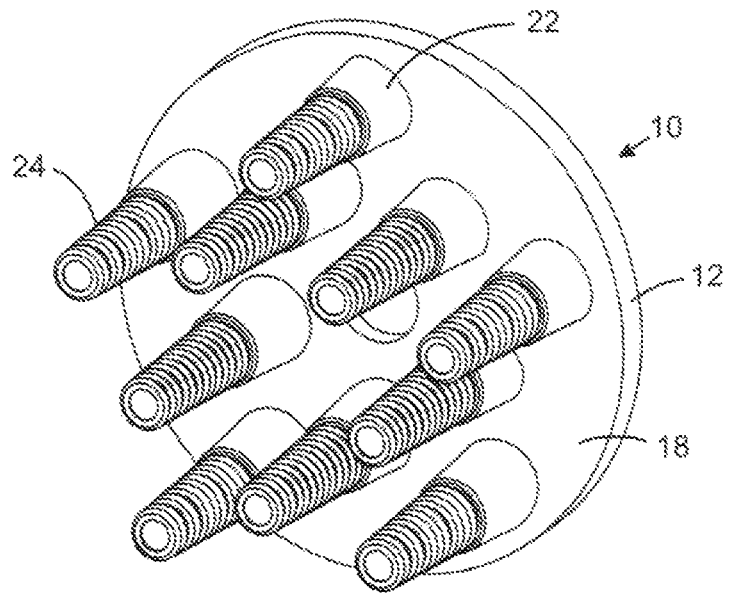
FIG. 1 is a front isometric view of the invented resilient rubber finger pad.
Figure 2:
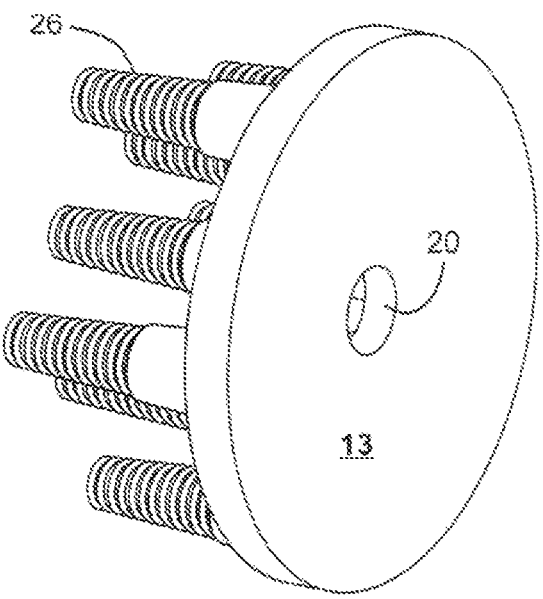
FIG. 2 is a rear isometric view of the finger pad.
Figure 3:
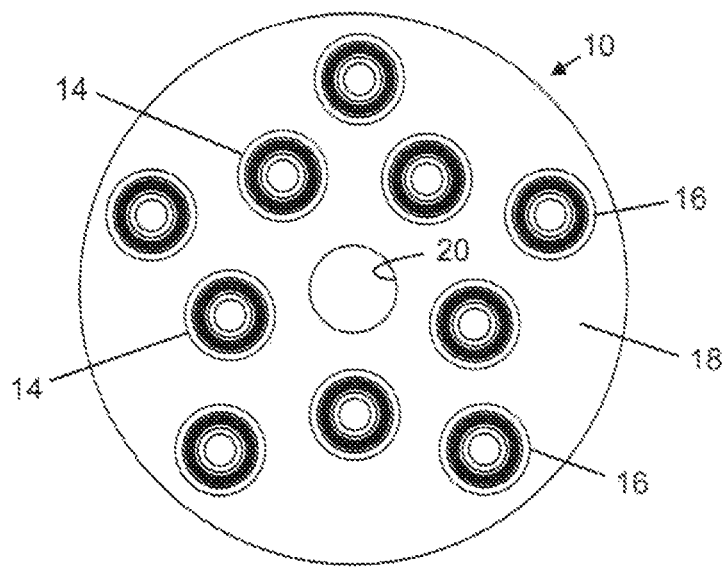
FIG. 3 is a front view of the resilient rubber finger pad of FIG. 1.
Figure 4:
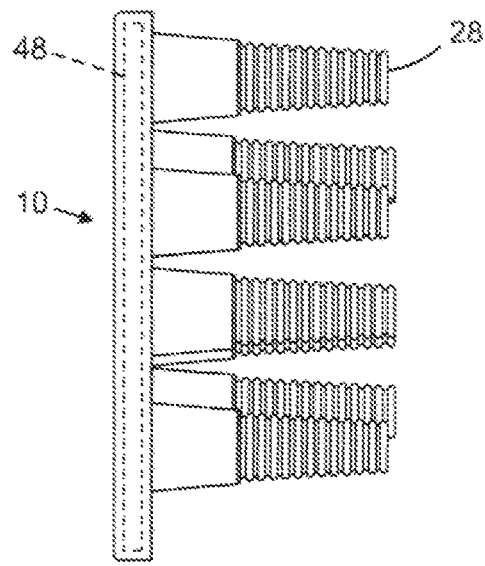
FIG. 4 is a left side view of the invented rubber finger pad; the right side view being a mirror image thereof.
Figure 5:
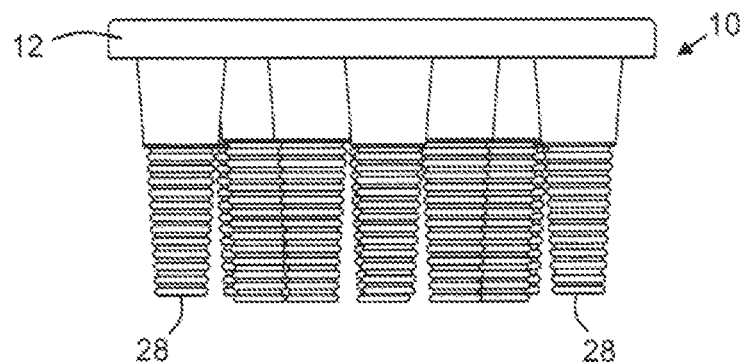
FIG. 5 is a top view of the invented finger pad, the bottom view being a mirror image thereof.
Figure 6:
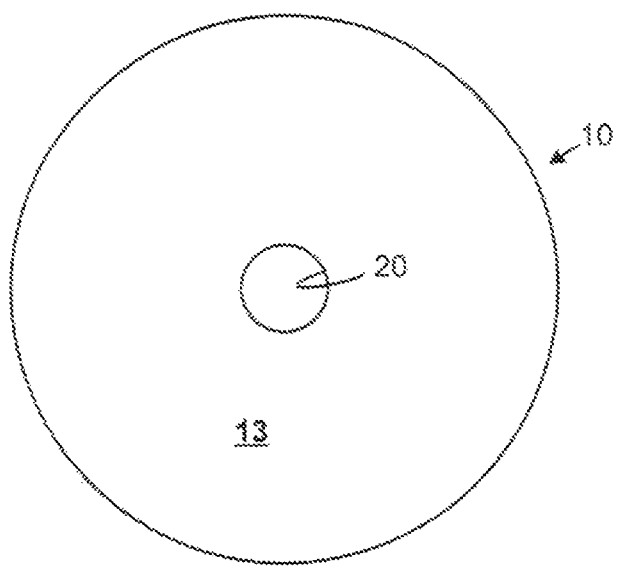
FIG. 6 is a rear view of the invented finger pad.

Referring now to the drawings, finger pad 10 is a unitary molded item which includes a circular base 12 having a rear face 13, and an opposed or front face 18 from which a ring of integral inner fingers 14 extend, and a ring of integral outer fingers 16 which also extend from face 18 of the base 12, and a central aperture 20.

The finger pad base 12 and fingers 14 and 16 are preferably made of a natural rubber, or alternatively of a synthetic material, that provides adequate friction to effectively remove feathers from the poultry carcass, but is also sufficiently pliable that a carcass is not damaged from repeated impacts by the spinning fingers. Alternative materials include, but are not limited to synthetic rubbers, styrene-butadiene rubber, isoprene rubber, butadiene rubber, ethylene-propylene rubber, butyl rubber, chloroprene rubber, nitrile rubber, and combinations thereof. The natural or synthetic rubber compositions can include various additives, such as tackifiers, pigments, anti-oxidants, and/or anti-UV.

Advantageously ten fingers are molded into the finger pad so that two concentric circles of five fingers each extend normally from face 18 of the finger pad 10. Integral fingers 14 form an inner circle or ring of fingers, and integral fingers 16 form an outer circle or ring of fingers. The fingers themselves each have an enlarged base 22, and a tapered shank 24. The shank is the operational part of the finger that actually comes into contact with a poultry carcass, and removes feathers therefrom. The fingers are advantageously provided with a grip pattern 26, which can be a series of furrows, a series of rings, or other pattern on the shank. The grip pattern provides increased friction between the finger and the feathered carcass, which thus improves the removal of feathers when the machinery is in operation. The fingers extend perpendicularly (normally) from the face 18 of the finger pad base 12, usually for a distance of about 2.8 to about 3.3 inches. Outer integral fingers 16 advantageously may be shorter than the inner integral fingers 14 by about 0.2 to 0.4 inch, which limits breakage of the tips 28 of the outer fingers 16 during operation.

As an Example, a base may be provided with 5 fingers on the inner circle of the finger pad, which inner fingers extend about 3 inches from the unitary base, and with 5 fingers on the outer circle of the finger pad, which outer fingers extend about 2.7 inches from the unitary base. Thus, the length of each of the fingers in the outer ring of fingers is from 7 to 13 percent shorter than the length of each of the fingers in the inner ring of fingers.

It should be noted that in current plucking machines, fingers vary in length as well as shape. The fingers in the finger pad of the present invention may also vary in length as well as shape.

Annular base plate 48 is circular with a central aperture 50, is fully embedded, or encapsulated, within base 12, and has a diameter slightly less than that of the finger pad base 12, which allows it to be fully encapsulated in base 12. Suitable materials for base plate 48 are stainless steel, hard plastic, hard natural rubber, hard elastomer, and a woven fabric treated to be stiff. Additional materials that are also suitable for use as embedded base plate 48 are polypropylene, polyolefins, polyesters, polyamides, polycarbonates, vinyl esters, epoxy resins, ultra high molecular weight polyethylene, acrylonitrile-butadiene-styrene, fiber reinforced plastic, fiber reinforced vinyl ester, fiber reinforced epoxy, thermoplastic and thermosetting plastic.

Figure 7:
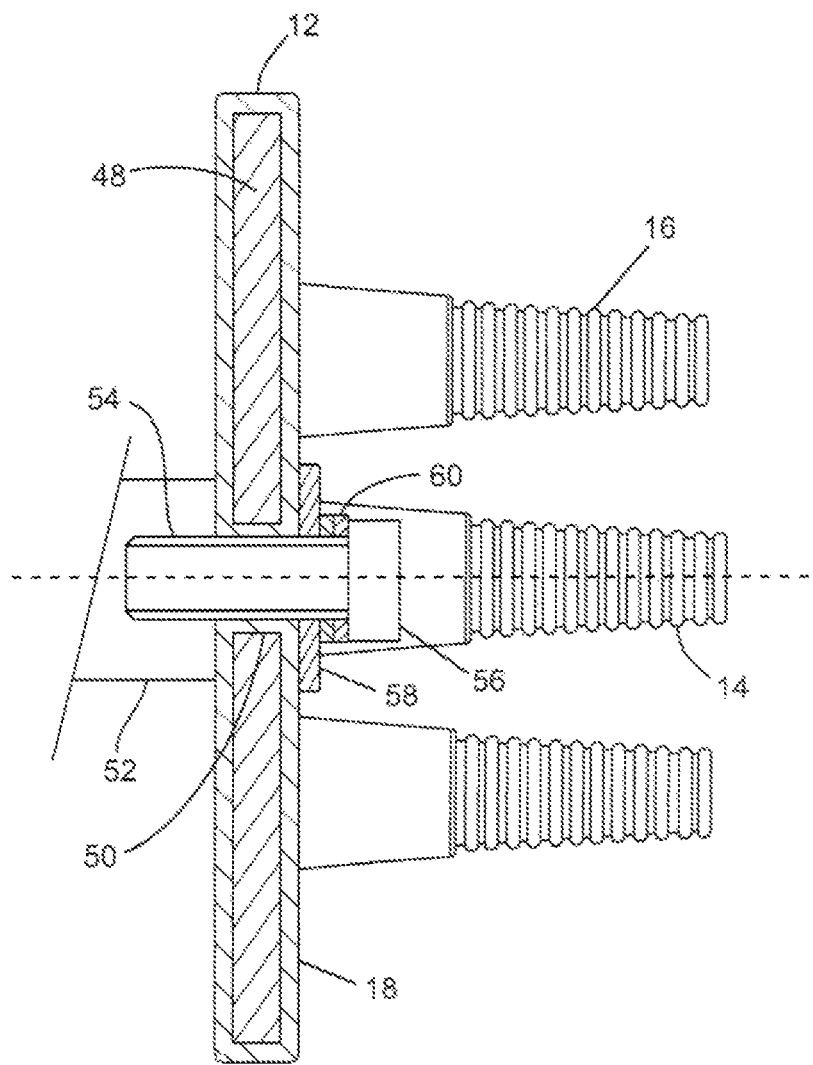
FIG. 7 is a vertical sectional view of the invented finger pad and finger pad assembly attached to a plucking machine shaft in accordance with the invention.

For attachment of the invented finger pad 10 to a plucking machine, a single threaded mounting bolt 56 is adapted to engage a threaded central hole 54 in the end of the hub drive shaft 52. When assembled, the finger pad assembly has a washer 58 and a lock washer 60 between the mounting bolt and the base 12, as shown in FIG. 7, to hold the finger pad assembly securely onto the shaft 52.

When finger pad 10 needs to be replaced, the finger pad is removed from the plucking machine by the mere removal of the single mounting bolt 56, a new finger pad is substituted, and is fastened to the hub drive shaft 52 by the single mounting bolt 56. Thus, finger replacement can be accomplished without the difficulty encountered in replacement of fingers in prior art devices.

Figure 8:
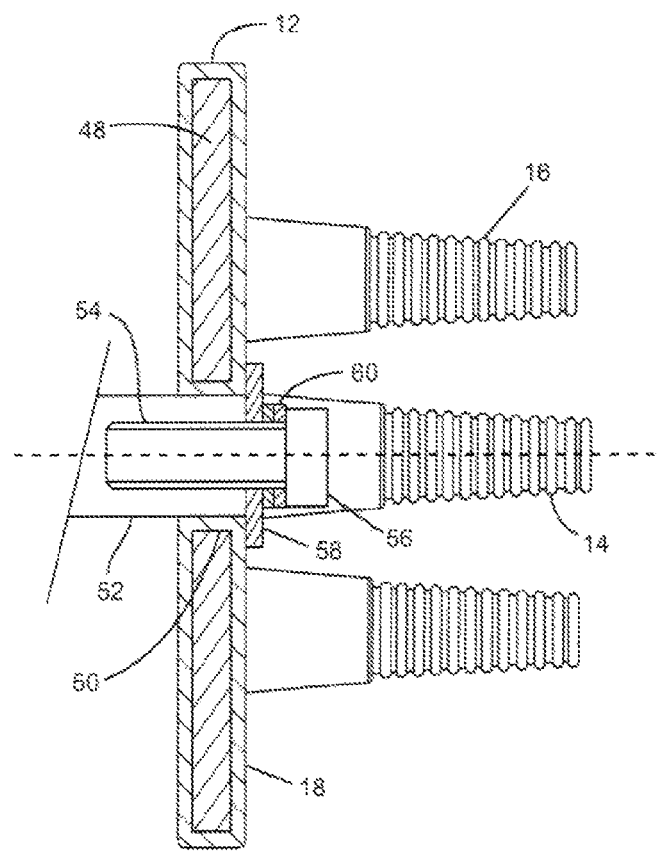
FIG. 8 is a vertical sectional view of an alternative finger pad and finger pad assembly attached to a plucking machine shaft in accordance with the invention.
Figure 9:
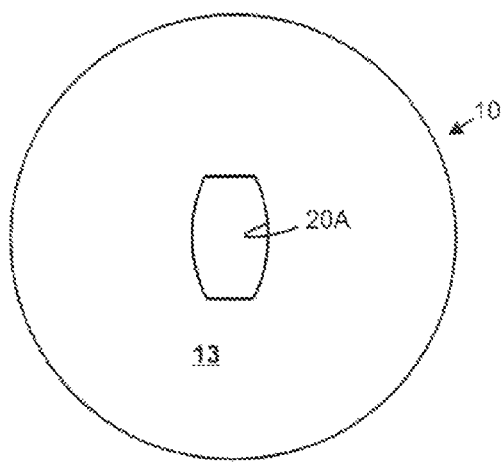
FIG. 9 is a rear view of alternative finger pad in accordance with FIG. 8.

Alternatively, finger pad 10 can be configured to fit over the end of hub drive shaft 52, as shown in FIG. 8, and the central hole 20A, as shown in FIG. 9, will be adapted to mate with the drive shaft 52 rather than to abut the end of the drive shaft. The operator may use multiple washers, if necessary to accomplish firm attachment of the finger pad.

SUMMARY OF THE ACHIEVEMENT OF THE OBJECTS OF THE INVENTION

From the foregoing, it is readily apparent that I have invented a novel resilient rubber finger pad for use with poultry feather plucking machines, and to a method of mounting, securing and replacing a resilient picking finger pad in a poultry feather-plucking device, which assembly is easily and quickly mounted, and easily removed and replaced by an untrained operator, and which requires fewer parts than are currently required in plucking machines.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

I claim:

1. A unitary finger pad for the processing of poultry carcasses, comprising:
   a circular base, having a rear flat face and a front face with a central aperture therethrough;
   an embedded annular base plate completely embedded within said circular base;
   a plurality of fingers extending from said front face, each of said fingers being fixed to said front face of said base, each of said fingers having a base, a tapered shank, and a grip pattern on a portion of said shank remote from said base;

said fingers being arranged in a pair of concentric rings on said base.

2. A unitary finger pad according to claim 1, wherein all of said plurality of fingers are provided with a grip pattern thereon.

3. A unitary finger pad according to claim 1, wherein said circular base and said fingers are made from a material selected from the group consisting of natural rubber, styrene-butadiene rubber, isoprene rubber, butadiene rubber, ethylene-propylene rubber, butyl rubber, chloroprene rubber, nitrile rubber, and combinations thereof.

4. A unitary finger pad according to claim 1, wherein said embedded annular base plate is made from a material selected from the group consisting of stainless steel, hard plastic, hard natural rubber, hard elastomer, and a woven fabric treated to be stiff.

5. A unitary finger pad according to claim 1, wherein said embedded annular base plate is made from a material selected from the group consisting of polypropylene, polyolefins, polyesters, polyamides, polycarbonates, vinyl esters, epoxy resins, ultra high molecular weight polyethylene, acrylonitrile-butadiene-styrene, fiber reinforced plastic, fiber reinforced vinyl ester, fiber reinforced epoxy, thermoplastic and thermosetting plastic.

6. A unitary finger pad according to claim 1, wherein said concentric rings comprise an inner ring of fingers and an outer ring of fingers, the length of each of said fingers in said outer ring of fingers being from 7 to 13 percent shorter than the length of each of said fingers in said inner ring of fingers.

7. A unitary finger pad according to claim 1, wherein said concentric rings comprise an inner ring of fingers and an outer ring of fingers, the length of each of said fingers in said inner ring of fingers being about 3 inches, and the length of each of said fingers in said outer ring of fingers being about 0.2 to about 0.4 inches shorter than the fingers in said inner ring.

8. A unitary finger pad according to claim 1, wherein said central aperture in said circular base is adapted to fit over and engage a drive shaft of a poultry feather plucking machine.

* * * * *